United States Patent
Chen

(10) Patent No.: US 7,393,164 B2
(45) Date of Patent: Jul. 1, 2008

(54) DYNAMIC BALANCING RING FOR CUTTER HOLDER

(75) Inventor: Peter Chen, Taoyuan County (TW)

(73) Assignee: Primetool Mfg, Inc., Taoyuan County (TW)

( * ) Notice: Subject to any disclaimer, the term of this patent is extended or adjusted under 35 U.S.C. 154(b) by 89 days.

(21) Appl. No.: 11/540,665

(22) Filed: Oct. 2, 2006

(65) Prior Publication Data

US 2008/0080942 A1    Apr. 3, 2008

(51) Int. Cl.
    *B23Q 3/12* (2006.01)
(52) U.S. Cl. ............... 409/141; 74/572.4; 408/143; 409/234
(58) Field of Classification Search ............ 409/141, 409/232, 234; 408/143, 238, 239 A, 239 R; 74/572.4, 572.2, 572.21; *B23Q 3/12*
    See application file for complete search history.

(56) References Cited

U.S. PATENT DOCUMENTS

| 5,033,923 A | * | 7/1991 | Osawa | 409/131 |
| 5,074,723 A | * | 12/1991 | Massa et al. | 409/131 |
| 5,096,345 A | * | 3/1992 | Toyomoto | 408/239 R |
| 5,263,995 A | * | 11/1993 | Mogilnicki et al. | 409/131 |
| 6,135,684 A | * | 10/2000 | Senzaki | 409/234 |
| 6,186,712 B1 | * | 2/2001 | Senzaki | 409/234 |
| 6,322,299 B1 | * | 11/2001 | Hartman | 409/141 |
| 6,471,453 B1 | * | 10/2002 | Winebrenner et al. | 409/141 |
| 6,557,445 B1 | * | 5/2003 | Ishikawa | 82/158 |
| 7,037,053 B2 | * | 5/2006 | Matsumoto et al. | 409/234 |
| 2003/0228199 A1 | * | 12/2003 | Matsumoto et al. | 409/141 |

FOREIGN PATENT DOCUMENTS

| JP | 2004-009244 A | * | 1/2004 |
| JP | 2005-305600 A | * | 11/2005 |
| TW | 538846 | | 6/2003 |
| TW | 570853 | | 1/2004 |

* cited by examiner

*Primary Examiner*—Daniel W Howell
(74) *Attorney, Agent, or Firm*—Muncy, Geissler, Olds & Lowe, PLLC

(57) ABSTRACT

The present invention provides a dynamic balancing ring for a cutter holder for balancing the cutter holder. The dynamic balancing ring includes a circle, plural fixing elements and an adjusting element. The plural fixing elements are used for fixing the circle on the cutter holder, and after the center-of-gravity position of the cutter holder is obtained by dynamic balance corrector, the adjusting element can be installed at a position on the circle corresponding to the center-of-gravity position, and through adjusting the adjusting element, the dynamic balance of the cutter holder can be corrected. For using the dynamic balancing ring for the cutter holder according to the present invention, it is convenient that the dynamic balancing ring can be directly installed on the cutter holder, which is needed to be corrected, without additional processing.

8 Claims, 5 Drawing Sheets

DYNAMIC BALANCING RING FOR CUTTER HOLDER

FIELD OF THE INVENTION

The present invention is related to a dynamic balancing ring used for a cutter holder, and more particularly to a dynamic balancing ring which can adjust the dynamic balance of the cutter holder.

BACKGROUND OF THE INVENTION

The traditional miller processes the cutter by utilizing a cutter carrier of a cutter holder, and one end of the cutter carrier has an arbor hole for fixing a cutter and the other end is fixed at a drive shaft, wherein the cutter carrier is driven by the drive shaft to rotate rapidly so that the cutter can drill, cut or grind the object. However, in the production process of the cutter carrier, because the cutter carrier is unbalanced owing to the standards (such as SK, BT, CAT, HSK) and types (such as lateral fixing type, face miller) of the cutter carrier itself and also the variation of the production accuracy and of the clamping precision of carrier, and the deformation caused by heat treatment, the two ends of the cutter carrier might have a core offset to cause an unbalance. If this unbalanced cutter carrier is used on the cutter holder, then the faster the rotation speed, the more obvious the vibration caused by the unbalanced centrifugation. In particular, the rotation speed of the modern miller can achieve tens of thousands of circles in one minute so that the unbalanced cutter carrier might cause a bigger vibration to make an error in the cutting of the object, to reduce the life time of the cutter, and more seriously, also to damage the drive shaft of the cutter holder. If it needs to buy a new carrier holder, the cost is proportion to the precision for manufacturing the cutter, and since the cutter and holder have different fabrication standards and manufacturing precision, the combination thereof might need to pay more attention to the balance correction therebetween. Furthermore, after a new cutter is clamped by a balanced holder, because the cutter always has a asymmetric shape and the holder might have other smaller components (such as bolt, clamping screw, bearing, collet etc.), each time a different cutter is used, a dynamic balance is needed.

For improving the defects described above, usually, the cutter carrier is firstly checked by a dynamic balance corrector to find the offset center of gravity thereof, and then, the problem caused by the unbalanced center of gravity of the cutter carrier will be corrected by the following methods of:

1. drilling one side of the cutter carrier which is closer to the center of gravity for reducing the weight at this side; 2. adding a mass on one side of the cutter carrier which is farther from the center gravity for balancing two sides of the carrier; and 3. mounting a movable protrusion on the carrier for adjusting the position of the gravity center slightly and then fixing the protrusion on the carrier after confirming a balance thereof so as to achieve a dynamic balance correction.

Although the methods above are workable, drilling is a destruction which might influence the using life of the cutter carrier and also may need a lot of accuracy as processing. As to the protrusion adjusting, although this method does not damage the carrier, the adjusting time becomes longer and the position thereof still might be moved as fixing the protrusion so that the balancing position must be found again, which actually takes a lot of time and is inconvenient. References can be found in R.O.C. Patent Publication Nos. 570853 and 538846.

SUMMARY OF THE INVENTION

In view of the prior art, for solving the defects described above, the present invention provides a dynamic balancing ring for a cutter holder so as to solve the problems relating dynamic balancing correction in the prior art and also reduce the installing time.

One object of the present invention is to provide a dynamic balancing ring for a cutter holder so as to correct the dynamic balance of a cutter holder having an offset gravity center.

Another object of the present invention is to provide a dynamic balancing ring for a cutter holder which can be detached from or mounted on the cutter holder as the dynamic balance correction is needed so that a processing on the holder can be saved.

In one embodiment, the present invention includes a circle, plural fixing screw holes, plural fixing elements, an adjusting screw hole, and an adjusting element. The plural fixing screw holes are distributed and mounted on the circle averagely, and the adjusting screw hole is mounted on the circle with the distances from thereof to two adjacent fixing screw holes being identical. The plural fixing elements can be screwed in the plural fixing screw holes for fixing the dynamic balancing ring at the cutter holder, and the adjusting element can be screwed in the adjusting screw hole for adjusting the dynamic balance of the cutter holder. The dynamic balancing ring according to the present invention can be freely mounted on any holder having an offset center of gravity for directly correcting the dynamic balance thereof without additionally adding mass or processing the cutter holder so that the time needed for correction can be significantly reduced.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
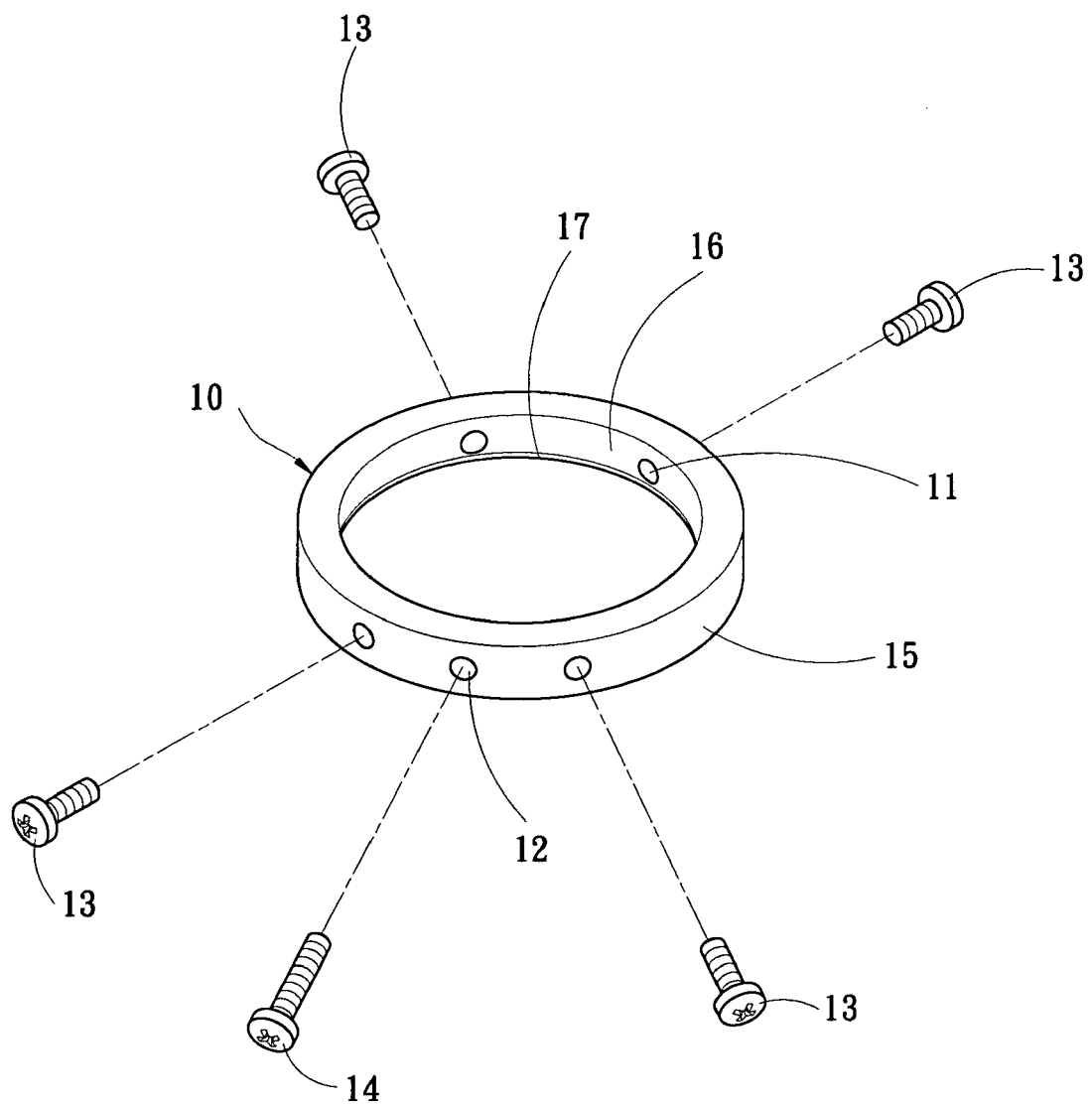
FIG. 1 is a three-dimensional drawing of a preferred embodiment according to the present invention.
Figure 2:
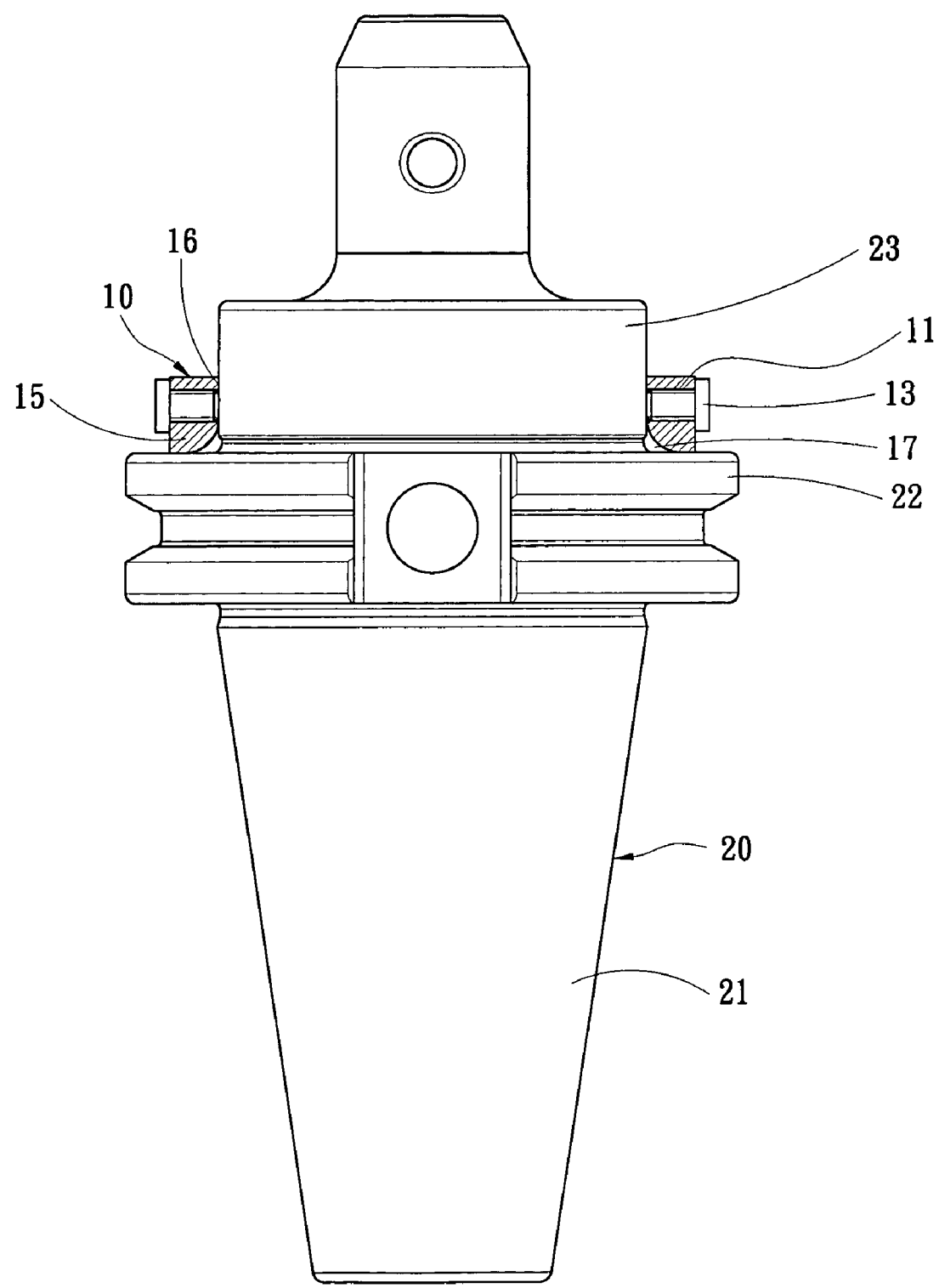
FIG. 2 is a sectional drawing of a preferred embodiment according to the present invention.
Figure 3:
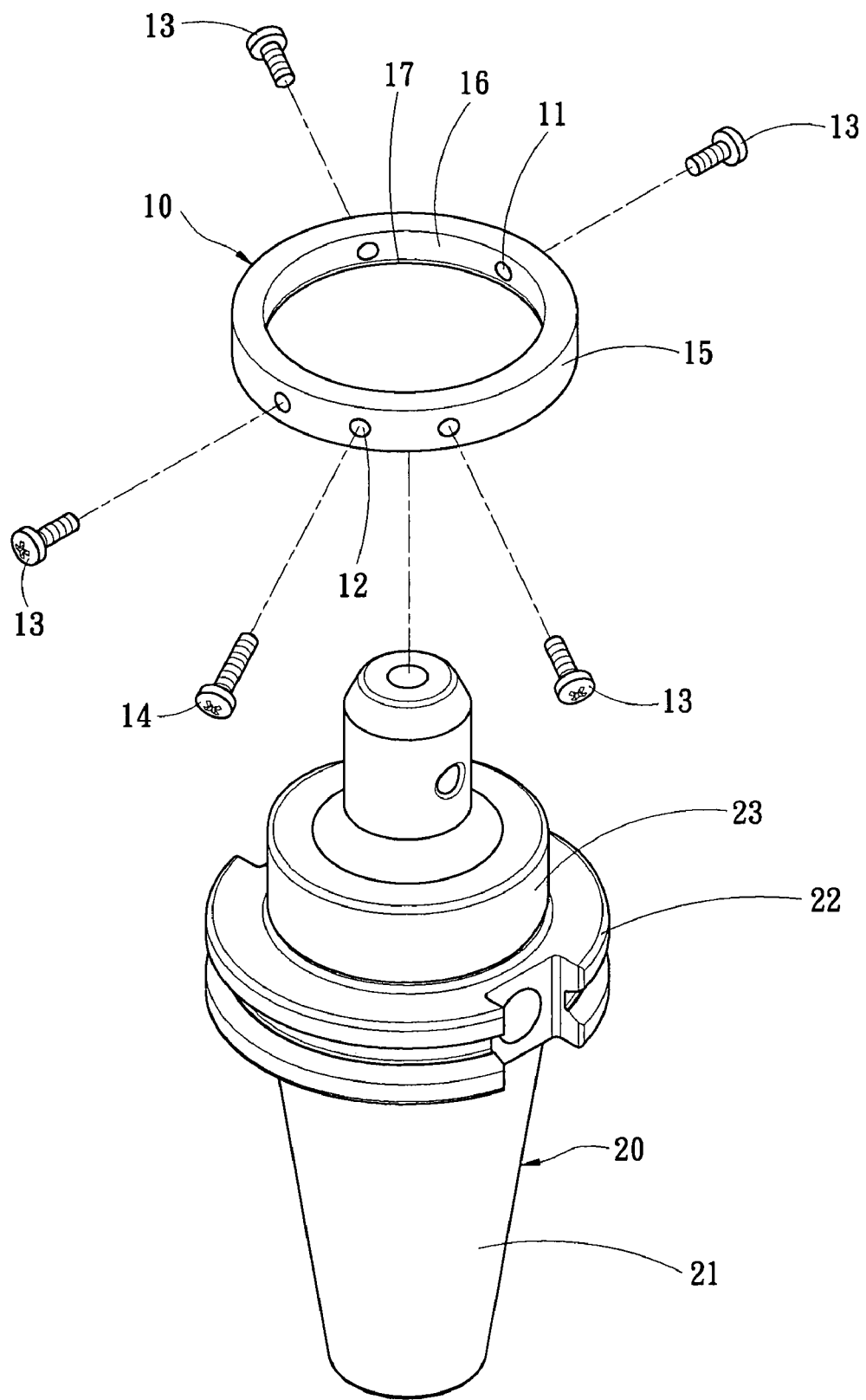
FIG. 3 is a three-dimensional decomposition drawing of a preferred embodiment according to the present invention.

Please refer FIGS. 1, 2 and 3 which are respectively a three-dimensional drawing, a sectional drawing and a three-dimensional decomposition drawing of a preferred embodiment according to the present invention.

In one embodiment, the present invention provides a dynamic balancing ring of a cutter holder 20 for balancing the usage of the cutter holder 20 which includes a circle 10, a plurality of fixing screw holes 11, a plurality of fixing elements 13, an adjusting screw hole 12, and an adjusting element 14. The circle 10 has an outer circumference surface 15 and an inner circumference surface 16. The plural fixing screw holes 11 are mounted on the circle 10 by each two oppositely facing to each other for balancing the weight and they pass through the circle 10 from the outer circumference surface 15 to the inner circumference surface 16. The adjusting screw hole 12 is mounted on the circle 10 and extended from the outer circumference surface 15 to the inner circumference surface 16, and the distances from the adjusting screw hole 12 to the fixing screw holes 11 at the right and the left sides are identical. The plural fixing elements 13 are extended from the outer circumference surface 15 to the inner circumference surface 16 and are screwed in the plural fixing screw holes 11 (depending on the real situation, the fixing element 13 can be selected to be, for example, a screw) so as to fix the dynamic balancing ring on the cutter holder 20. The adjusting element 14 is screwed in the adjusting screw hole 12 from the outer circumference surface 15 to the inner circumference surface 16 (depending on the real situation, the adjusting element 14 can be selected to be, for example, screw or weight block with thread) for adjusting the dynamic balance of the cutter holder 20 (depending on the real situation, the material and size of the adjusting element can be changed for increasing or decreasing the weight).

Figure 4A:
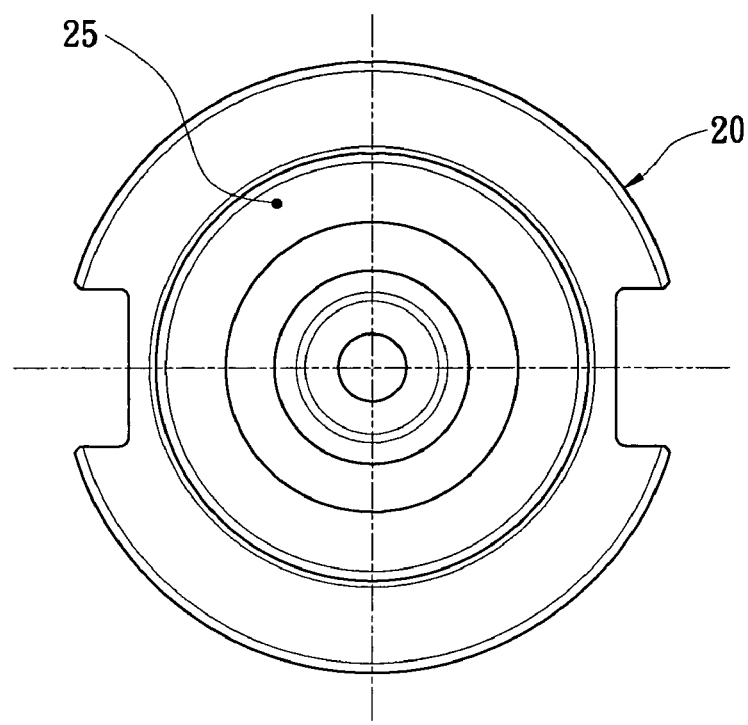
FIG. 4A is a schematic view showing the center-of-gravity position of a preferred embodiment according to the present invention.
Figure 4B:
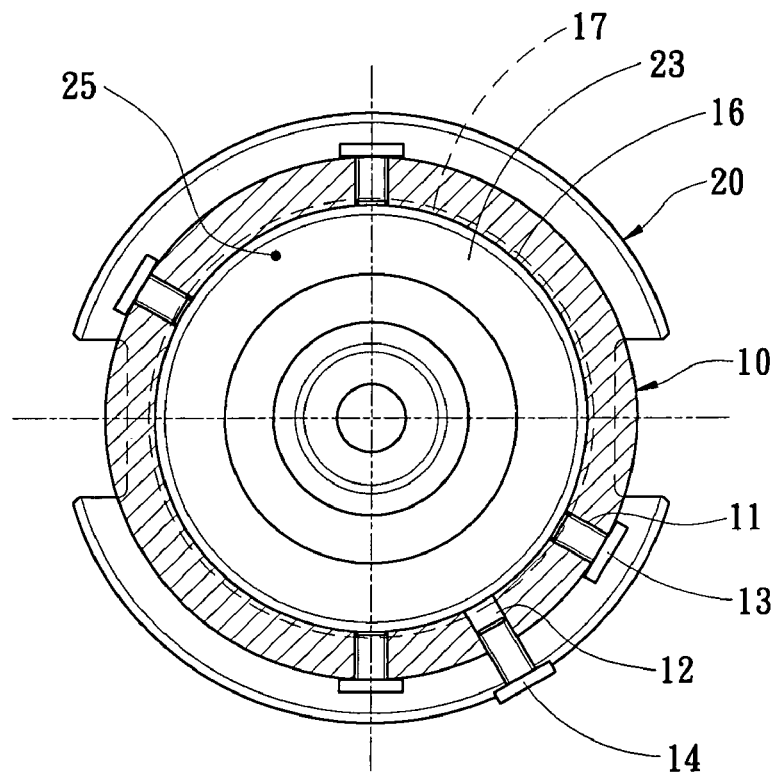
FIG. 4B is a schematic view showing the dynamic balance correction of a preferred embodiment according to the present invention.
Figure 5:
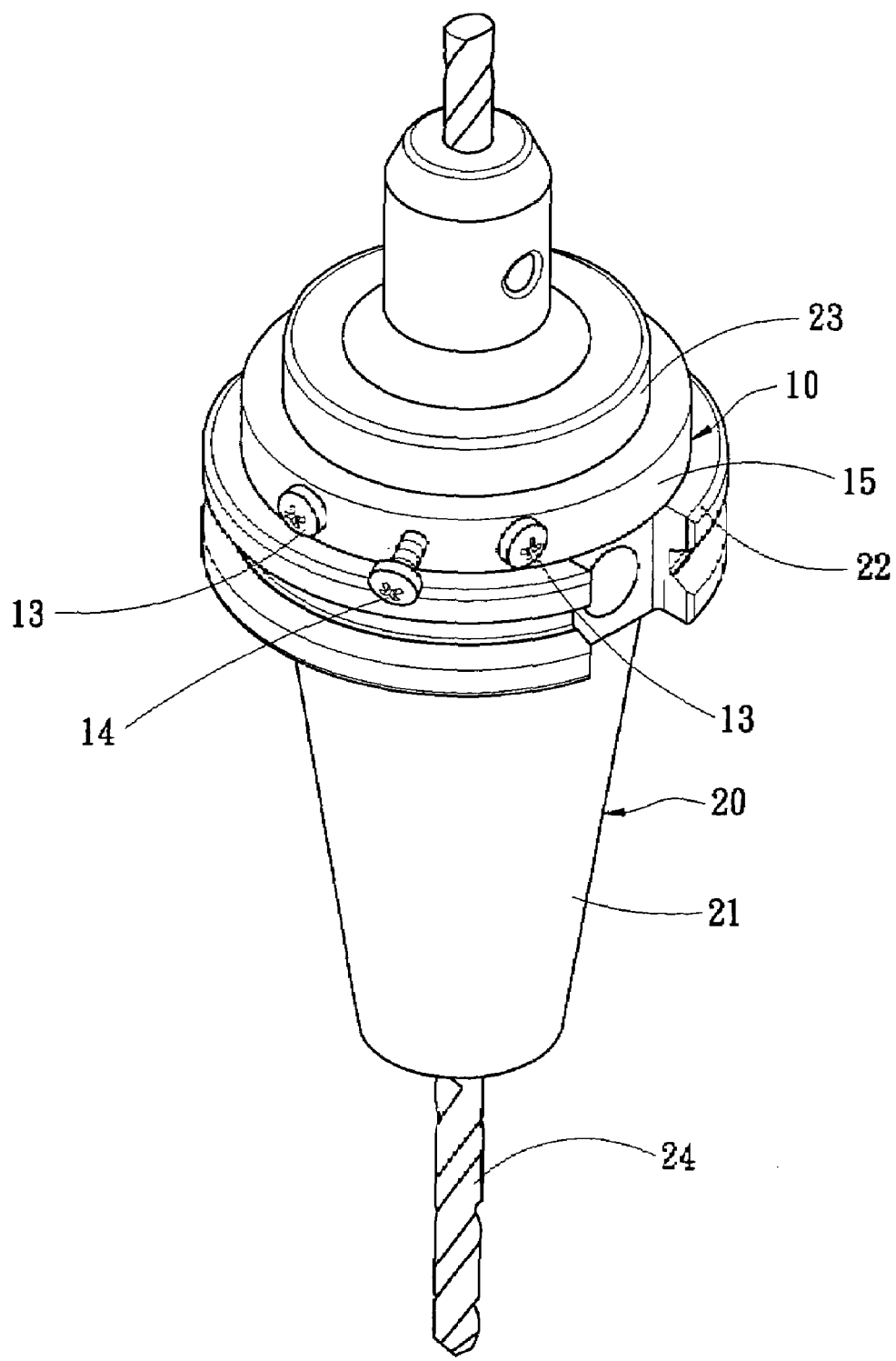
FIG. 5 is a three-dimensional drawing showing a preferred embodiment in operating according to the present invention.

As operation, please refer to FIGS. 4A, 4B and 5. Before using the cutter holder 20 and the cutter 24, a dynamic balance correction is required for avoiding an offset gravity center from damaging the cutter holder 20 and the cutter 24. The cutter holder 20 has a cutter carrier 21, a protruded circle 22 and a sleeve receiving portion 23, wherein the size of the sleeve receiving portion 23 is corresponding to that of the inner circumference surface 16 of the circle 10 (which can be an irregular shape and can be modified in accordance with the shape of the sleeve receiving portion 23), and the inner circumference 16 has an arc portion 17 for assisting in sleeving on the sleeve receiving portion 23. Firstly, the cutter 24 is installed in the cutter carrier 21, the whole cutter holder 20 is mounted on a dynamic balancing corrector (not shown), and then after the measurement, an offset angle, an unbalance amount and a relative angle can be obtained. The offset angle (as shown in FIG. 4A) is namely the center-of-gravity position 25, and the unbalance amount is namely the magnitude of weight of the dynamic balance amount, and further, the dynamic balance can be corrected according to the relative angle (which is namely the relative position of the center-of-gravity position 25 on the circle 10). The circle 10 is mounted on the sleeve receiving portion 23 and rejected to the protruded circle 22, and at the same time, the adjusting screw hole 12 is moved to the relative angle position (as shown in FIG. 4B). Then, the plural fixing elements 13 are screwed into the plural fixing screw holes 11 from the outer circumference surface 15 to the inner circumference surface 16 for fixing the circle 10 at the sleeve receiving portion 23 so as to avoid the circle 10 from coming off the cutter holder 20 due to the high speed rotation. After fixing the circle 10, the adjusting element 14 is screwed into the adjusting screw hole 12 from the outer circumference surface 15 to the inner circumference surface 16, and the adjusting element 14 will be screwed more tightly or loosely according to the unbalance amount provided by the dynamic balance corrector for achieving a dynamic balance correction (which can be confirmed by the dynamic balance corrector if needed). When changing the cutter or the cutter holder 20, the dynamic balancing ring according to the present invention can be detached and re-installed on another cutter holder 20 to be used, and then, the correction of the cutter 24 or cutter holder 20 to be used is performed again according to the unbalance amount, offset angle and relative angle which are provided by the dynamic balance corrector.

The dynamic balancing ring for the cutter holder 20 in the preferred embodiment according to the present invention can cooperate with other equivalent equipment for correcting the dynamic balance of any component with a rotation ability, such as a shaft, a grinding wheel, a motor and the likes.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dynamic balancing ring for a cutter holder, comprising:
    a circle having an outer circumference surface and an inner circumference surface;
    a plurality of fixing screw holes, mounted on the circle, passing through the circle from the outer circumference surface to the inner circumference surface;
    a plurality of fixing elements screwed in the plurality of fixing screw holes from the outer circumference surface to the inner circumference surface;
    an adjusting screw hole mounted on the circle and extended from the outer circumference surface to the inner circumference surface; and
    an adjusting element screwed in the adjusting screw hole from the outer circumference surface to the inner circumference surface for adjusting a dynamic balance of the cutter holder.

2. The dynamic balancing ring for a cutter holder as claimed in claim 1, wherein the circle has an arc portion.

3. The dynamic balancing ring for a cutter holder as claimed in claim 1, wherein the inner circumference surface has an irregular shape.

4. The dynamic balancing ring for a cutter holder as claimed in claim 1, wherein the fixing element is a screw.

5. The dynamic balancing ring for a cutter holder as claimed in claim 1, wherein the adjusting element is a screw.

6. The dynamic balancing ring for a cutter holder as claimed in claim 1, wherein the adjusting element is a screw with a mass.

7. The dynamic balancing ring for a cutter holder as claimed in claim 1, wherein each two of the plurality of fixing screw holes, on the circle, are oppositely faced to each other for achieving a weight balance.

8. The dynamic balancing ring for a cutter holder as claimed in claim 1, wherein the distances from the adjusting screw hole to the fixing screw holes at the right and the left sides are identical.

* * * * *